Sept. 10, 1974  R. A. GRANT  3,835,041
PROCESSES FOR THE PURIFICATION
Filed July 3, 1972  3 Sheets-Sheet 1
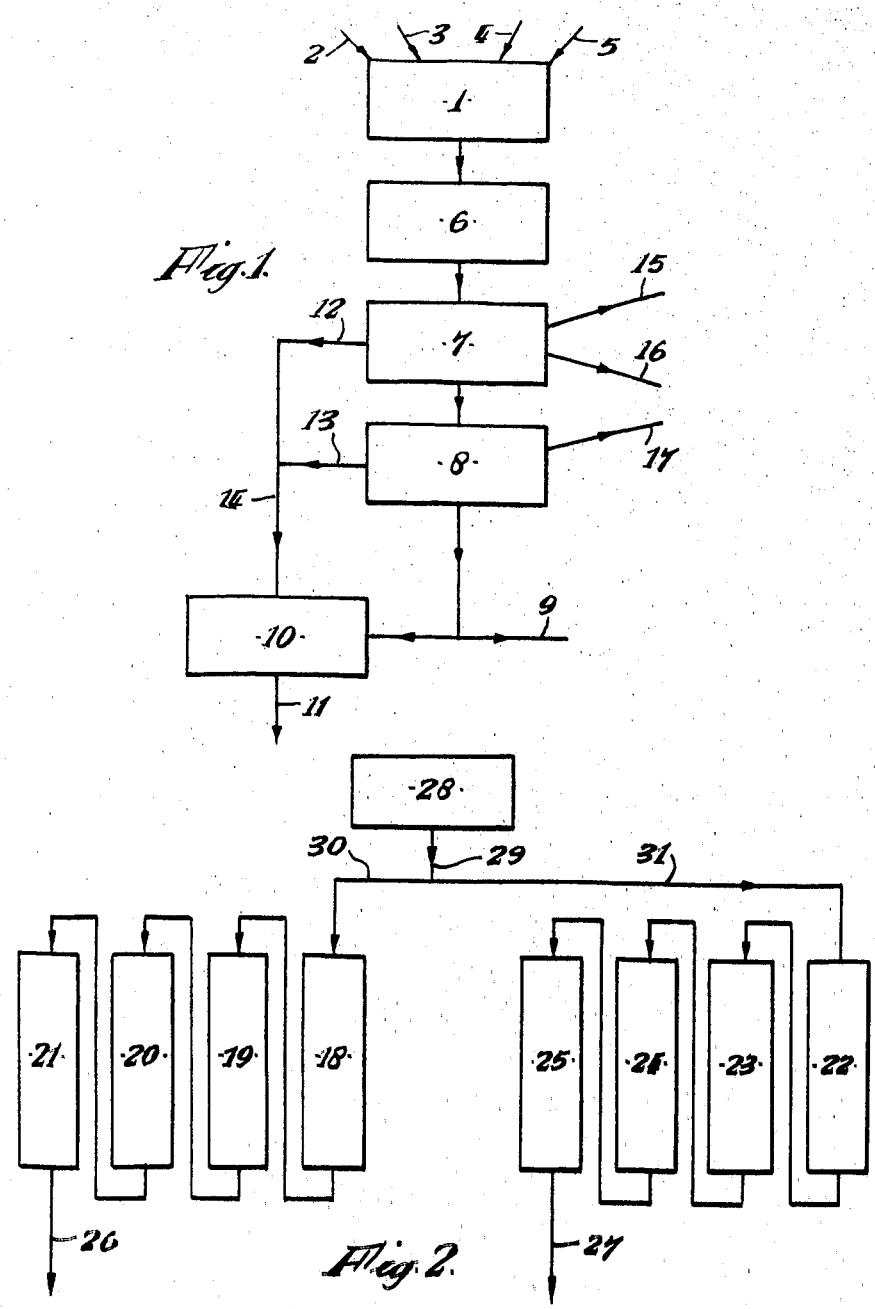

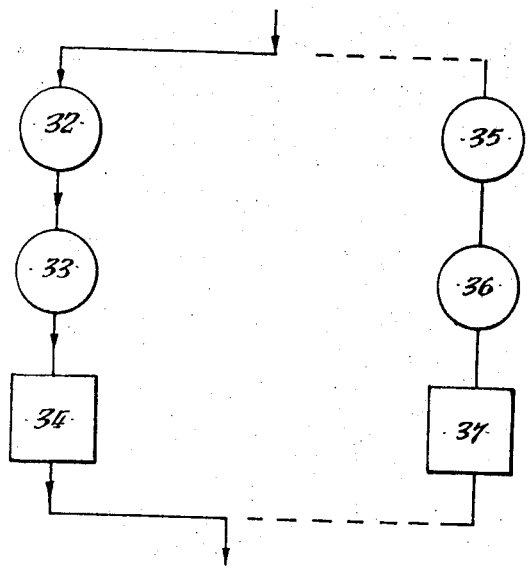
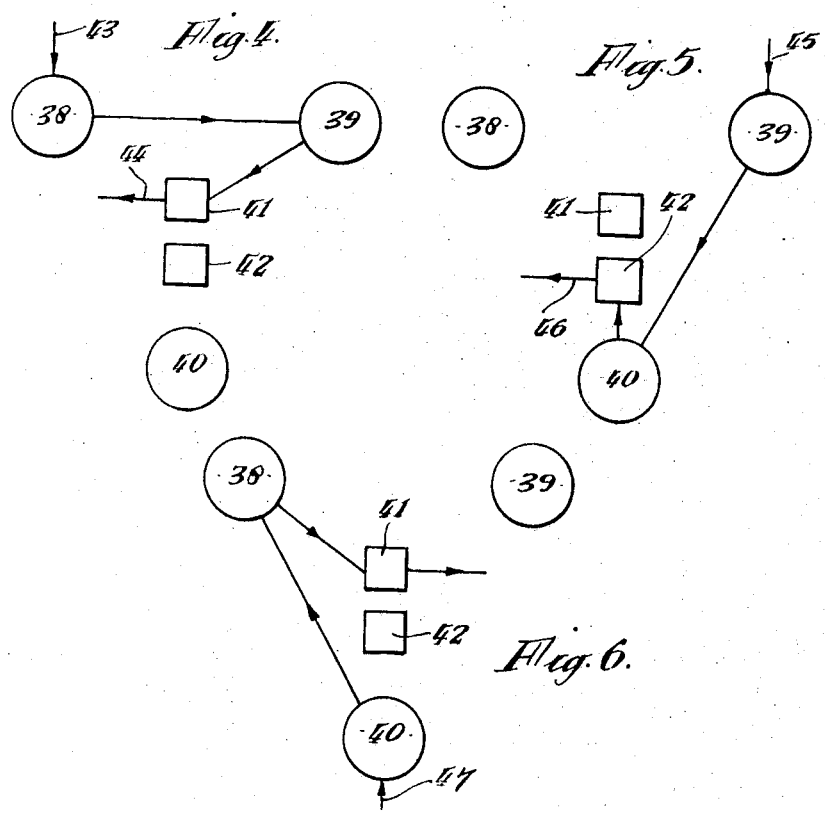

United States Patent Office 3,835,041
Patented Sept. 10, 1974

3,835,041
PROCESSES FOR THE PURIFICATION OF WASTE EFFLUENTS
Roy Arthur Grant, Poole, England, assignor to Tasman Vaccine Laboratory Limited, Upper Hutt, New Zealand
Continuation-in-part of application Ser. No. 841,430, July 14, 1969, now Patent No. 3,697,419. This application July 3, 1972, Ser. No. 268,299
The portion of the term of the patent subsequent to Mar. 30, 1988, has been disclaimed
Int. Cl. B01d 15/04
U.S. Cl. 210—27                                2 Claims

ABSTRACT OF THE DISCLOSURE

A process is disclosed for removing protein from waste effluents containing same using ion exchange methods. The ion exchange resin is a cross linked regenerated cellulose matrix modified by the introduction of groups capable of cation exchange or groups capable of anion exchange.

---

Figure 7:
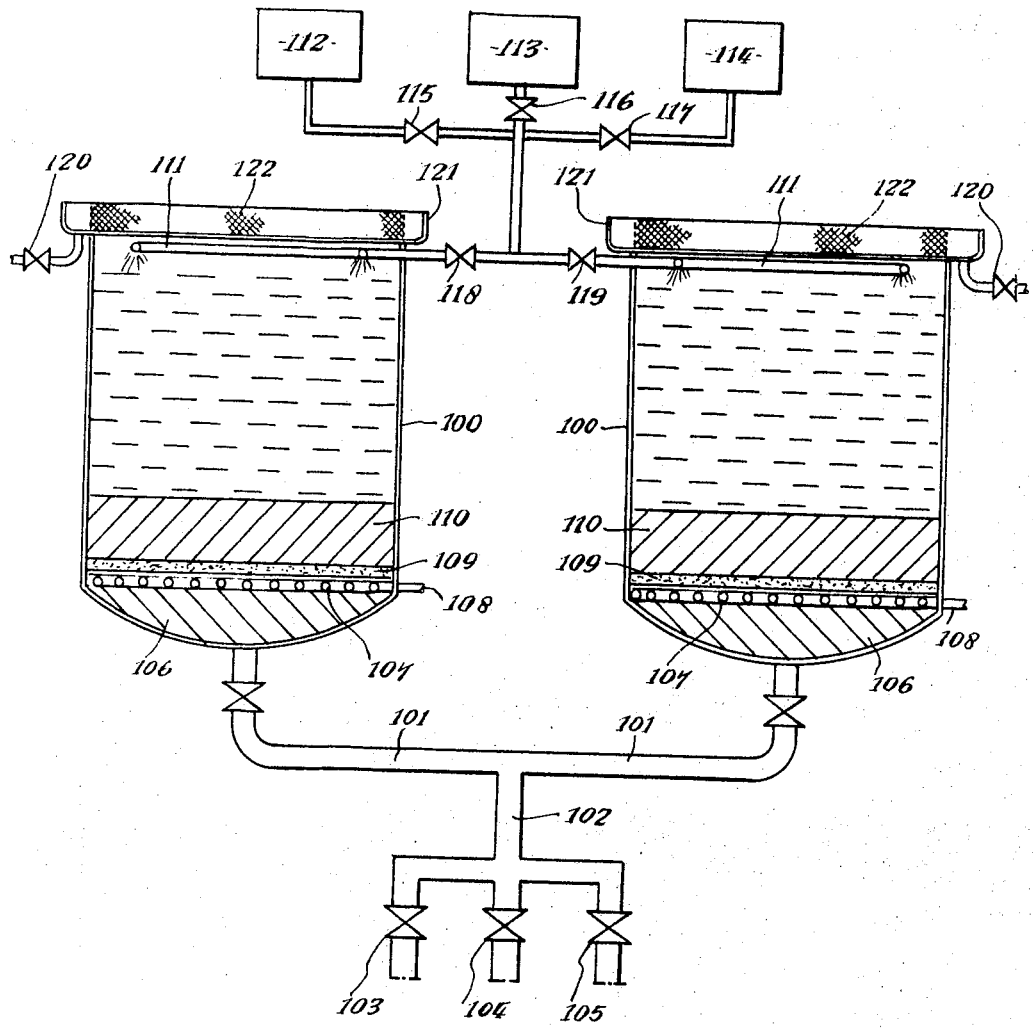

This application is a continuation-in-part of my copending application Ser. No. 841,430, filed July 14, 1969, now Pat. No. 3,697,419.

This invention relates to processes for the purification of waste effluent containing protein.

Meat works, abattoirs, fish canneries, dairies, glue works and the like industrial concerns handling animal products produce large volumes of effluent. Such effluent may vary in composition, but a typical effluent from an abattoir results from the use of large quantities of water for the washing of slaughterhouse equipment and carcasses. It thus contains appreciable amounts of blood proteins, soluble protein from muscle and other tissues, and suspended or colloidal protein material, together with a certain amount of particulate tissue fragments and fat. Although the concentration of protein in the effluent is usually quite low (about ½ lb. per 100 gals.) the solution is capable of nourishing abundant undesirable organisms. It has been estimated that in a typical slaughterhouse the material lost in the effluent constitutes about 5% of the weight of slaughtered animals, the remaining 95% of the weight being utilised in one way or another. Another source of protein containing effluents are natural rubber latex processing factories.

Some factories producing protein-containing effluents may be so sited that the effluent can be discharged directly into a river or into the sea without treatment. However, where this is not possible, it is usual to treat the effluent to reduce the concentration of proteins and other nutrients before discharging the effluent into a waterway in order to prevent the pollution effects of the undesirable organisms that may grow on the untreated effluent as well as to prevent the stench caused by the decomposing animal matter.

At present, effluents such as those from meat works are usually treated by biological treatment in holding tanks. Such biological treatment involves both aerobic and anaerobic degradation of the organic material in the effluent. This has the double disadvantage that a large area of ground is required for the equipment and that the process destroys the potentially valuable proteins. Furthermore the expense of providing suitable holding tanks is considerable.

Where it is desired to discharge the effluent directly into a municipal sewer the authorities responsible for treating the sewage may levy a considerable charge on the meat works for disposing of the effluent because of the capital expenditure involved in providing suitable holding tanks and the running costs of operating the process.

It has been proposed (U.S. Pat. No. 2,446,913—Erlich) to pass the slop or thin stillage remaining after the alcohol has been distilled off from a fermented mixture of 90% wheat and 10% barley malt through beds of an ion exchange resin after first having centrifuged the slop or thin stillage. The slop or thin stillage, before passage through the beds of ion exchange resin, is said to contain "proteinaceous compounds" in addition to salts and a nitrogen free extract. The proportion of "proteinaceous compounds" is estimated by performing a nitrogen analysis and multiplying the result by 6.25. However, there is no unambiguous proof that the "proteinaceous compounds" are true proteins. The "proteinaceous compounds"-containing solution is passed first through a cation absorbing type ("C") synthetic phenol-formaldehyde resin and then through an anion absorbing type ("A") synthetic amine-formaldehyde resin. On regenerating the resins and combining the regenerants a solid is obtained which is stated to contain 29% "proteinaceous compounds" in addition to various inorganic salts. However there is no proof given that the "proteinaceous compounds" are true protein materials, the figure of 29% being merely based upon a nitrogen analysis the result of which is multiplied by 6.25. Even ammonium salts can be classed as "proteinaceous compound" on this basis.

It is also known to extract proteins on a laboratory scale from aqueous solutions thereof by passage through a column of diethylaminoethyl cellulose (DEAE-cellulose). An example of the use of DEAE-cellulose for extracting protein from solution is described in U.S. Pat. No. 3,409,605 (Florini). However, although DEAE-cellulose is successful on a laboratory scale where very low flow rates can be tolerated, it is impracticable to use DEAE-cellulose resins for industrial purification of raw protein-containing effluents because the DEAE-cellulose resins very quickly become blocked and the beds of the DEAE-cellulose become choked so that the flow rate drops to an unacceptably low level.

It is an object of the present invention to provide a process for purifying a waste effluent by removal of proteins therefrom which can be practiced using equipment of low capital cost and occupying only a small ground area.

It is a further object of the present invention to provide an ion exchange process for purifying raw protein-containing effluents to remove protein therefrom.

It is yet another object of the present invention to provide a process for purifying protein-containing effluents by removing protein therefrom without destroying the protein.

It is a still further object of the present invention to provide a process for purifying effluents from meat works, slaughterhouses, fish canneries, and the like by removing protein from such effluents in recoverable form.

Essentially, the present invention is directed to a process for the purification of a waste effluent containing protein comprising the steps of:

(a) passing the said effluent through a bed of a granular ion exchange material in the form of a cross-linked regenerated cellulose modified by the introduction of cationic or anionic exchange groups to remove protein from said effluent,
(b) recovering essentially protein-free effluent, and
(c) subsequently regenerating the ion exchange material for use in a further cycle.

The ion exchange resin for use in the process of the present invention is a cross-linked regenerated cellulose modfiied by the introduction of cationic or anionic exchange groups. Such resins are described in U.S. Pat. No. 3,573,277. The preferred form of regenerated cellulose used in making the ion exchange resin is viscose.

The ion exchange material may contain groups capable of anion exchange or groups capable of cation exchange. Typical groups capable of cation exchange which may be present in the ion exchange material include carboxylic acid groups, sulfonic acid groups and phosphate groups and salts thereof. Typical groups capable of anion exchange which may be present in the ion exchange material include amino, optionally substituted monoalkylamino, optionally substituted dialkylamino, optionally substituted arylamino, guanidino and quaternary ammonium groups. The ion exchange groups may be bound to the regenerated cellulose chains of the cross-linked regenerated cellulose matrix through brodge members such as alkylene (e.g. methylene, ethylene, 1,2- or 1,3-propylene, or 1,4-butylene), alkylene-oxy-alkylene (e.g. ethylene-oxy-ethylene), hydroxyalkylene and the like.

Cross-linking of the regenerated cellulose may be carried out using essentially any at least bifunctional compound capable of reacting with two hydroxyl groups to form covalent bonds under suitable conditions. Suitable cross-linking agents include aldehydes, diisocyanates, dicarboxylic acids and anhydrides, and compounds containing at least two reactive groups selected from the group consisting of halogen atoms and epoxide groups, for example reactive dihalogenated compounds, reactive diepoxides, diisocyanates, and compounds containing a reactive halogen atom and a reactive epoxide group. Thus typical cross-linking agents include formaldehyde, glyoxal, glutaraldehyde, acrolein, epichlorhydrin, dichlorhydrin, butanediol bisepoxypropyl ether, bisepoxypropyl ether, ethylene glycol bisepoxypropyl ether, phosgene, oxalyl chloride, adipoyl chloride, 2,4,6-trichlorotriazine, 2-methyl-5-bromomethyl-4,6-dichloropyrimidine, 2 - phenylamino-4,6 - dichlorotriazine, p - dibromomethylbenzene, $\alpha,\alpha'$-dichloroacetone, phthalic anhydride, maleic anhydride, 1,4-dichlorobutane, 1,6-dibromohexane, toluene diisocyanate, p,p' - diisocyanatodiphenylmethane, naphthalene-1,5-diisocyanate, metaphenylene diisocyanate, bitolylene diisocyanate and the like. Cross-linking may also be achieved physically, for example by exposure of the regenerated cellulose to high intensity ionising radiation (such as that afforded by ultraviolet light, gamma rays or electron beams) in the presence of water and sensitizing chemicals. In a preferred ion exchange material the cross-linking is provided by aldehyde residues, such as formaldehyde residues, produced by treatment of the regenerated cellulose with an aldehyde under acid conditions. In other especially preferred materials the cross-linking is achieved by treatment with epichlorhydrin or dichlorhydrin under basic conditions. Preferably the degree of cross-linking in the ion exchange material varies between 1 and 10 percent, especially from 1 to 2 percent. The degree of cross-linking is expressed in terms of the ratio of the weight of cross-linking agent reacting with a given dry weight of the regenerated cellulose. This is readily measured by noting the weight of cross-linking agent that is added for cross-linking and subtracting the weight of cross-linking agent that remains (if any) at the end of the cross-linking reaction.

The ion exchange groups are introduced into the regenerated cellulose either simultaneously with or after cross-linking. To introduce groups capable of cation exchange there may be used, for example, chloro or bromo substituted carboxylic and sulfonic acids and salts thereof, for example chloracetic acid, bromacetic acid, chloropropionic acid, chloromethane sulfonic acid, bromoethanesulfonic acid, chloroethanesulfonic acid and salts, preferably alkali metal and alkaline earth metal salts thereof, and the like as well as 1,3-propanesultone. As examples of compounds suitable for introducing groups capable of anion exchange there may be mentioned chloro and bromo substituted tertiary amines and salts thereof, such as $\beta$-chloroethyldiethylamine, $\beta$-bromoethyldiethylamine, $\beta$-chloroethyldimethylamine, $\beta$-bromoethyldimethylamine, chloromethyldimethylamine, bromomethyldimethylamine, chloromethyldiethylamine, bromomethyldiethylamine, $\beta$-chloroethyldi-($\beta$-hydroxyethyl)amine, $\beta$-bromoethyldi-($\beta$-hydroxyethyl)amine, chloromethyldi-($\beta$-hydroxyethyl)amine, bromomethyldi-($\beta$-hydroxyethyl)-amine, N - - chloroethylmorpholine, N-$\beta$-bromoethylmorpholine, N-bromomethylmorpholine, N-chloromethylmorpholine, and their salts, for example the hydrochlorides and hydrobromides thereof, and the like. Quaternary ammonium groups may be introduced by the use of quaternised forms of the above-mentioned amines, for example the quaternary salts obtained by treatment of such amines with methyliodide, methylsulfate, ethylsulfate, benzyl chloride or the like. Quaternation may take place before or after reaction with the regenerated cellulose. It is also possible to introduce groups capable of anion exchange by reaction with epichlorhydrin and amines such as ethanolamine, isopropanolamine, diethanolamine, diisopropanolamine, triethanolamine, triiosopropanolamine, dimethylaminoethanol, diethylaminoethanol, diisopropylaminoethanol and the like. In this case the epichlorhydrin is intended to attach the amino groups to the regenerated cellulose chains, although if an already cross-linked regenerated cellulose is reacted with a mixture of epichlorhydrin and one of the specified amines the epichlorhydrin may incidentally introduce further cross-linking residues into the resin matrix.

Methods for determining the ion exchange capacity of an ion exchange material, that is to say its ability to exchange small ions such as calcium or chloride, are well known. The ion exchange capacity is expressed in milliequivalents exchangeable ions per gram of the dry ion exchange material. Various standard methods for determining the ion exchange capacity are described, for example, in Kunin "Ion Exchange Resins", New York, 1958 (see pages 343–345). In the process of the present invention it is preferred to use ion exchange materials having an ion exchange capacity for small ions of between about 0.5 and about 2 milliequivalents per gram, more especially about 1 milliequivalent per gram.

In the process of the present invention, the waste effluent may, if desired, be submitted to a pre-treatment step to remove at least some of the protein and/or fat in the effluent. In one form or pre-treatment the effluent is collected in a holding tank and air is blown into the collected effluent thereby subjecting it to air flotation, Upon standing, a scum which mainly consists of protein and fat, forms on the surface of the effluent and can be scraped off.

Other methods of pre-treatment include filtration to remove suspended matter.

By the term "protein" there is meant a material which may contain some protein breakdown products (i.e. amino acids and/or polypeptides) since these will almost inevitably be present in protein containing effluents, but which is predominantly in the form of protein macromolecules. In general, solutions of macromolecular protein material can be dialysed (i.e. the protein material does not penetrate a semi-permeable membrane), exhibit absorbance in their U.V. spectra (ultraviolet spectra) at about 280$\mu$ (due to the presence of tyrosine residues) and give a white precipitate on addition of phosphotungstic acid solution.

The ion exchange material used in the process of the invention has only a limited ion exchange capacity. A bed of the ion exchange material of finite size can only pick up a finite amount of protein from solutions thereof. Thus it is periodically necessary to stop the passage of effluent through the bed of ion exchange material and to regenerate the bed of ion exchange material for use in a further cycle. Although it is possible to use a single bed of ion exchange material and to periodically interrupt the flow of effluent whilst the bed is regenerated, it is preferred to operate the process using a plurality of beds of ion exchange material, the flow of effluent being periodically switched from one bed to another so that regeneration of the beds can be accomplished in turn without interrupting the flow of effluent.

Although for many purposes it is sufficient to pass the effluent through a single bed of resin, in some cases it is desirable to pass the effluent through several beds in series. For example the effluent can be passed through one or more beds of resin having groups capable of cation exchange and then through one or more beds of resin having groups capable of anion exchange, or vice versa.

Regeneration of the bed or beds of ion exchange resin can be accomplished by use of a suitable regenerant solution. Typical solutions that may be used to regenerate the ion exchange material are aqueous solution of inorganic salts such as sodium chloride, potassium chloride, sodium sulfate, potassium sulfate, sodium bromide, sodium acid phosphate, disodium phosphate, trisodium phosphate, and the like and mixtures thereof. To such inorganic salts solutions may be added acids or bases. Preferred are strong mineral acids such as hydrochloric acid, sulfuric acid and the like, and strong alkalis such as sodium hydroxide, potassium hydroxide, sodium carbonate, potassium carbonate and the like. The regenerant solution may contain at least 0.1% but preferably not more than 10% by weight of acid or alkali and even more preferably not more than 5% by weight. The concentration of salt may vary, for example, from 0.1% by weight up to 10% or more by weight, but is preferably in the range of 1% to 5% by weight of the regenerant solution. Typical regenerant solutions are 3% by weight brine solutions containing either 1% sulfuric acid or 1% sodium hydroxide. Although in most cases it is unimportant whether a neutral, acid or alkaline regenerant solution is used, some proteins are sensitive in particular to acid and may be precipitated by acid. In such a case use of an acid regenerant solution could lead to formation of a precipitate of protein on the ion exchange material. It is therefore recommended to test a portion of an effluent on a laboratory scale to make sure that all the protein absorbed can also be desorbed before embarking on large scale regeneration of the exhausted resin. In general it is, however, preferred to use an acidic regenerant if the resin contains groups capable of cation exchange, such as carboxylic or sulfonic acid groups, and to use an alkaline regenerant if the resin contains groups capable of anion exchange.

In a preferred process the bed (or each bed if more than one is used) of ion exchange material is periodically backwashed, that is to say the regenerated bed is washed by passing water through the bed in the opposite direction to the direction in which the effluent is passed.

After regeneration more effluent can be passed through the bed of regenerated ion exchange material and the cycle repeated.

The regenerant solution after passage through the spent bed of ion exchange material can be further treated as described in my co-pending Application Serial No. 268,282 filed simultaneously herewith in order to recover protein. (Co-pending Patent Application Serial No. 268,282 is a continuation-in-part of my Application Serial No. 161,110 filed 9th July 1971, now abandoned, which was divided out of my co-pending Patent Application Serial No. 841,430 filed 14th July 1969.)

Typically the process of the invention can be applied to effluents such as slaughterboard washings, paunch washings, skin washings, dairy effluents, glue works effluents, natural rubber latex factory effluents, fish cannery effluents, and the like.

The method of pretreatment, if one is used, is largely determined by the nature of the effluent and such factors as the source of the protein or proteins in it, the concentration of protein in the effluent and the presence of other constituents such as fat. The choice of ion exchange material, i.e. whether it contains groups capable of cation exchange or anion exchange, is largely determined by the source of the protein or proteins. In some cases it is more satisfactory to use, for example a DEAE-form (diethylaminoethyl form) of cross-linked regenerated cellulose and in others, for example, a CM-form (carboxymethyl form). In yet other instances it may be necessary to use first a DEAE-form and then a CM-form, or vice versa, in order to obtain the desired purification of the effluent.

The essentially protein-free solution recovered after passage of the effluent through the ion exchange material has a low C.O.D. and B.O.D. value and may be discharged to waste or it may be reused for such purposes as washing of equipment, or washing down the slaughterboard. However if desired it may be further purified by passage through a scavenging bed of a resin in fibrous or sponge form such as, for example, diethylaminoethyl cellulose (DEAE-cellulose) or carboxymethyl cellulose. Alternatively, or in addition, the resulting essentially protein-free effluent may be passed through a percolating filter or bone char, activated carbon or coke filter.

Although gradient elution can be used for regeneration of an exhausted bed of resin (i.e. one that has taken up protein from solution), it is usually preferable to effect regeneration by stepwise elution in order to keep the volume of protein-containing regenerant solution small. In this way substantially all the protein adsorbed by the resin can be recovered as a relatively concentrated solution of protein from which protein can be relatively simply recovered. Using a suitable regenerant solution (e.g. 3% $NaCl + 1\%$ $NaOH$ or 1% $H_2SO_4$) the adsorbed protein can generally be recovered in a small volume, e.g. about 1 bed volume, of regenerant. In a preferred process the effluent level is adjusted so that the bed of resin is just covered by liquid and therefore contains 1 bed volume of liquid. Regenerant solution is then slowly added to the top of the bed of resin. The U.V. absorbance of the eluate at 280 m$\mu$ rises from zero very sharply just after a volume of regenerant has been added corresponding to the "bed volume." At this point the flow solution through the bed can be interrupted for a period, for example for about 1 hour, in order to allow the bed of resin to equilibrate with the regenerant solution. The regenerant solution can then be run out of the bed, its place being taken by a slow stream of pure water. In this way substantially all the adsorbed protein is desorbed in about 1 bed volume of regenerant. Alternatively the flow of regenerant can be continuous through the bed of resin the progress of regeneration being monitored by measuring the U.V. absorbance of the eluate at 280 m$\mu$. Regeneration is complete when the absorbance returns substantially to zero.

To recover protein from the regenerant solution from the resin bed a variety of techniques may be used. In one preferred process the pH of the regenerant from the resin bed is adjusted to 4.5 to 5.0. Ideally one should adjust the pH to correspond with the isoelectric point of the protein or proteins in the effluent but, since the effluent usually contains a variety of proteins, a compromise value for the pH may have to be adopted. For effluents from animal sources it is usually satisfactory to adjust the pH at this stage to 4.5 to 5.0. At this point a precipitate of protein may appear. In order to coagulate the precipitated protein and to facilitate separation of the precipitated protein from the supernatant liquid the solution may be heated to a temperature of, for example, 80° C. to 100° C. or higher (if superatmospheric pressure is used). Heating may be accomplished externally but a convenient method of heating the solution is to blow steam through it. The coagulated protein can be separated by filtration or centrifugation.

In an alternative technique, after adjustment of the pH of the regenerant solution from the bed of resin to 4.5 to 5.0, a flocculant may be added in order to precipitate the protein. If the protein is to be used for nutritional purposes, e.g. for feeding poultry, a non-toxic flocculant should be used, for example sodium hexametaphosphate, ligninsulphonic acid or a mixture of so-called Triple Super Phosphate and alkali. If necessary the solution can be heated as before in order to ensure coagulation, followed by filtration or centrifugation.

The ion exchange resin is preferably in granular or particulate form having a size of preferably 20 to 200 mesh, or even more preferably 50 to 100 mesh (British Standard 410/62).

Comparative Experiments

A series of experiments was made to test the ability of various ion exchange resins to take up protein from solution. In each case a bed of resin of approximately 60 ml. bed volume was made up by slurrying a suitable amount of resin in deionized water, pouring the slurry into a 1.8 cm. diameter glass column and allowing the resin to settle out and the excess water to drain off. A 0.1 percent w./v. egg albumin solution was then run carefully onto the damp bed of resin and the absorbance of the solution emerging from the bottom of the column was measured at a wavelength of 280 m$\mu$ using an Optica Densitronic spectrophotometer fitted with a 1 cm. path flow cell. The presence of protein in the solution was indicated by absorbance at this wavelength which is believed to be due to the presence of tyrosine residues in the protein. On the other hand, the absence of protein in the solution leaving the column was indicated by low U.V. absorbance. As a further test for the presence of protein, fractions from the bottom of the column were tested with phospho-tungstic acid. The presence of protein was indicated by a white precipitate. There was no precipitate formed on addition of phosphotungstic acid when there was no protein present. This test with phosphotungstic acid affords a sensitive qualitative test for protein in the range of 20 to 1000 p.p.m.

The resins were then regenerated and the presence or absence of protein in the regenerant eluate (as indicated by the U.V. adsorbances and the phosphotungstic acid test) showed whether the resin had in fact absorbed protein from the solution or not.

The following resins were tested:

A. Permutit Zeocarb 216 resin

This resin is a phenol-formaldehyde condensate in granular form and contains —OH and —COOH groups. It behaves as a weakly acidic cation exchanger and corresponds to Erlich's type "C" (U.S. Pat. 2,446,913, Column 5, line 59 to 61). The column bed tested contained 35 g. (dry weight of resin, mesh size 14 52 (British Standard 410/62). The resin column was regenerated with 0.5N-HCl, at a flow rate of 5 ml./min. for 30 minutes and then washed with deionized water until the effluent was neutral. The resin column was kept covered with liquid throughout the experiment.

Upon running the test solution through the column at a flow rate of 5 ml./min., after approximately 1 bed volume of albumin solution had passed into the column (thereby essentially displacing the deionized water which was on the column before the albumin solution was applied, i.e. the displacement volume), the effluent gave a precipitate with phosphotungstic acid and the recorder showed an abrupt rise in the absorbance at 280 m$\mu$ from zero to a value essentially equal to that of the test solution. All fractions subsequently tested showed the presence of protein. This showed that a large proportion of the protein was *not* being absorbed from the solution.

After rinsing the resin bed with water, the bed was regenerated with 1N-HCl solution and 20 ml. fractions were again collected and tested with phosphotungstic acid solution. No material giving a positive test with phosphotungstic acid was eluted from the column showing that the resin had not taken up any significant amount of protein from the test solution.

B. Amberlite IR–4B resin

This is a weakly basic anion exchange resin of the synthetic amine-formaldehyde type (Erlich's type "A"—see U.S. Pat. No. 2,446,913, column 5 line 63). Again 35 g. dry weight of resin was used. This was previously treated with 250 ml. of 0.5N–NaOH overnight to remove at least most of the soluble coloured material present in the resin and then washed extensively with water until neutral. 400 ml. of the test solution of albumin was passed into the column at a flow rate of 5 mls./min. Immediately after the displacement volume of water had emerged from the column the base line showed an abrupt rise of the optical density at 280 m$\mu$. Simultaneous tests of 20 ml. fractions of the effluent with phosphotungstic acid solution gave a white precipitate after the first two fractions. This indicates that the protein was passing through the resin with no significant uptake of protein by the resin.

The column was then rinsed with water and alkaline brine (5% NaCl+1% NaOH) was passed into the column. A quantity of coloured material was eluted from the column by the regenerant solution. However tests of the effluent with phosphotungstic acid solution gave no significant turbidity or precipitate, thus indicating absence of protein. These tests clearly indicate that the synthetic amine-formaldehyde resin was incapable of extracting protein from aqueous solution.

C. Epichlorhydrin cross-linked regenerated cellulose containing diethylaminoethyl groups This resin was prepared by the method described in Example 2 of U.S. Pat. 3,573,277, except that the regenerated cellulose used has a mesh size of 30 to 50 mesh (British Standard 410/62). 12 g. (dry weight) of the resin was used to form a 60 ml. bed volume column. The bed was regenerated with 0.5 NaOH solution at a flow rate of 5 ml./min. for 30 minutes and washed with water until the effluent was neutral. 400 ml. of the test solution of egg albumin was then passed through the bed at a flow rate of 5 ml./min. 20 fractions of the effluent were collected and tested with phosphotungstic acid solution as before. No precipitate was formed and no change in absorbance at 280 m$\mu$ was noted as the solution was run through the column. This indicates that the resin was taking up essentially all the protein from the solution.

Upon regeneration with alkaline brine (5% brine NaCl +1% NaOH) 20 ml. fractions of the eluate were tested with phosphotungstic acid solution and it was found that very heavy precipitates were formed in the third to the fifth fractions, after which the amount of precipitate decreased. The amount of the precipitate from each of the third to the fifth fractions was very heavy compared with the precipitate obtained from a 20 ml. sample of the test albumin solution. The obsorbance at 280 m$\mu$ showed a corresponding sharp peak corresponding to the third to fifth fractions.

This test showed that a cross-linked regenerated cellulose containing groups capable of anion exchange can absorb protein from solution and that the absorbed protein can be quickly and efficiently desorbed during regeneration, the protein being eluted as a narrow zone of concentrated solution.

Similar results to those found for Resin C were obtained with the following Resins D and E.

D. Epichlorhydrin cross-linked regenerated cellulose in granular form containing carboxyl groups This resin which contains carboxymethyl groups was prepared by method described in Example 3 of U.S. Pat. 3,573,277. It was regenerated by washing with acid. The successful use of this resin in the above test shows that a cross-linked regenerated cellulose containing groups capable of cation exchange can be used to absorb protein from solution in a readily desorbable form.

E. Formaldehyde cross-linked regenerated cellulose containing diethylaminoethyl groups This resin was prepared by the method described in Example 4 of U.S. Pat. 3,573,277.

The following resins were also tested:

F. Imac A17P resin

This is a conventional synthetic ion exchange resin of the weak base type produced by the condensation of epichlorhydrin with polyamines.

G. Amberlite IRA–401S resin (chloride form)

This is a porous strong base anion exchanger in bead form derived from polystyrene crosslinked with divinylbenzene.

H. Amberlite IRA–401S resin (hydroxide form)

Using the above resins F to H similar results were obtained to those obtained for resins A and B, i.e. it was found that the resins were incapable of taking up protein from the test solution.

The invention will now be further described by way of example with reference to the accompanying drawings in which, FIG. 1 is a block diagram of apparatus for use in treating effluent according to the invention, FIG. 2 is a diagram of an experimental filter bed complex using a particulate filter according to the invention, FIG. 3 shows a simple experimental regeneration cycle, FIGS. 4, 5 and 6 show steps in an alternative "merry-go-round" regeneration system, and FIG. 7 shows a vertical cross section through a plant using the process of the invention.

Referring to the drawings, a receiving vessel, 1, is provided, adapted to receive waste effluents. For example, in a freezing works the effluents may be from a slaughter board drain 2, a casing drain 3, a skin wash drain 4 and/or a paunch washings drain 5. However, it is to be understood that in practice, it may be necessary or desirable to treat departmental wastes separately. From the receiving vessel 1, the washings or effluent are passed through a mechanical pre-treatment section 6. In this pre-treatment section the treatment can consist of passing the material through a 60 mesh sieve, the sieve being provided with suitable means whereby the collected material may be removed, either continuously or from time to time. Alternatively, on a larger scale a rotary vacuum filter can be used. Following mechanical treatment, the effluent passes to a filter bed 7 in which the filter bed comprises a granular or particulate resin material consisting of a cross-linked regenerated cellulose matrix into which have been introduced ion exchange groups capable of anion exchange or of cation exchange. Passage of the effluent or washings through the bed 7 removes essentially all the protein therefrom. After such treatment, I have found it preferable that the effluent be further treated by a fibrous resin in a scavenger bed 8. Following this, the effluent may pass either directly through conduit 9, to a waste discharge station, or may be passed through a percolating filter or bone char filter 10 whereupon the outgoing effluent from conduit 11 leading from filter 10 may be chorinated and re-used.

Both the filter bed 7 and scavenger bed 8 may be backwashed when desired to dislodge solid matter from the resins. The backwash waters may be also conducted to the filter 10 by means of conduits 12, 13, and 14. During the regeneration of the resin in the filter bed 7, the effluent containing the released protein may be collected through conduit 15. Similarly, during regeneration of the fibrous resin in the scavenger bed 8, released protein may be collected through conduit 17. Waste liquors which do not need to go through the filter 10 may be withdrawn from the filter bed 7 and scavenger bed 8 through conduits 16 and 9 respectively.

Referring now to FIG. 2, the equipment shown in the block diagram of FIG. 1 under reference 7, consists of a series of tanks 18 to 25, the first group 18–21 being connected in series, and the second group 22–25 being also connected in series, the first group supplying an output 26, the second group supplying an output at 27, and both groups leading to beds of fibrous resin. The two groups of tanks 18–21 and 22–25 are filled with a cross-linked regenerated cellulose ion exchange material and are supplied from a supply tank 28, which may be the pre-treatment tank 6 shown in FIG. 1 (or may be an alternative tank), through leads 29, 30 and 31. Although each of the tanks 18–25 may contain the same resin, it is often desirable that one or more of the tanks in each set should contain a resin capable of cation exchange whilst others contain a resin capable of anion exchange. The tanks may be of any suitable size, for example, for experimental purposes, these tanks have been made in four inch diameter glass columns, and the settled heights of resin have been about 12 inches high in each tank. The flow rate, in this case, is approximately eight gallons per hour, and the dead volume in each tank, about one gallon per tank. For a pilot plant, the tanks can be approximately three feet in diameter, and ten feet high, holding a total quantity of approximately one ton of resin. A plant having an input of 1 million gallons per day would require a bed approximately thirty five feet in diameter, and one to two feet deep. Of course, the area of the bed could be spread over several tanks. These figures are based on the ion exchangers described in U.S. Pat. 3,573,277, using the very simplest form of operation.

In FIG. 3, a simple regeneration system is shown, in which the beds shown diagrammatically at 32, comprise beds of granular cross-linked regenerated cellulose ion exchange material in acid form, the beds 33 granular beds in basic form, and beds 34 comprise further beds in which there is a resin in fibrous or sponge form, these forming a scavening filter. The fibrous form of resin may be, for example, diethylaminoethyl cellulose (DEAE-cellulose), or carboxymethyl cellulose, which are particularly useful for removing protein and fat which may break through the particulate resin beds as they approach complete exhaustion. It should be pointed out that it is not usually practicable to apply the raw effluent directly to the scavening filter, in view of the large amounts of colloidal or suspended matter which may be present in the raw effluent, and which would result in rapid clogging of the scavening filter. It is to be understood that when the beds 32 to 34 are in use, the beds 35, 36 and 37 (corresponding with the beds 32 to 34), are being regenerated. Regeneration is effected by treating the ion exchange material, if the resin contains groups capable of cation exchange, with (e.g. hydrochloric acid) or a mixture of an acid and a mineral salt or, if the resin contains groups capable of anion exchange, with a solution of alkali (e.g. NaOH) or a mixture of alkali and a mineral salt (e.g. NaCl). During the regeneration process, the protein is removed from the beds as a relatively concentrated solution. When regeneration is complete, i.e. when the application of a further amount of regenerant solution produces no significant quantities of protein, the bed is washed with water to remove excess regenerant solution, and the bed is then ready for a further cycle of effluent purification. The process consists generally, of alternating cycles of effluent penetratration and regeneration of the resins bed. The period of time during which effluent is passed through a bed or series of beds before regeneration is started, depends on the purpose of the treatment of the effluent. If the purpose of the treatment is to achieve the maximum uptake of protein from the effluent, then for a given weight of resin, it is necessary that the capacity of the resin should be as nearly as possible completely exhausted. Under these conditions, protein will leak or break through the bed or beds in increasing amounts as the bed or beds become more and more nearly exhausted, so that a proportion of the resultant effluent will still contain considerable proportions of protein. On the other hand, if the main purpose is to purify the effluent, then passing of effluent through the beds will be discontinued sooner and the extent to which the capacity is exhausted will be decided on by economic and other factors since, of course, it is not possible to completely free the effluent of protein under normal commercial working.

I have found that, in certain extreme cases, even after the use of a fibrous scavenger, there is some protein left in the effluent, and in addition, there is some odour due possibly to amines resulting from degradation of the protein. These may be reduced by passing the effluent in a final step through a percolating filter or bone char, activated carbon or coke filter (such as the filter 10 referred to in connection with FIG. 1).

In relation to regeneration, a "merrygoround" regeneration cycle may be used as shown in FIGS. 4 and 6. In this arrangement, three tanks 38, 39 and 40 are provided which contain a particulate or granular form (e.g. 50–100 mesh) of cross-linked regenerated cellulose ion exchange material, and two sets of filters 41 and 42 contain a fibrous form of resin such as DEAE-cellulose. In FIG. 4, the input 43 is led into tank 38, the effluent therefrom passing to tank 39, and then through the fibrous filter 41 to the output 44. In the meantime, the resin in tank 40 and the fibrous filter 42 are being regenerated. In FIG. 5, the tank 39 receives its input from conduit 45, the effluent is passed to granular filter set 40 then to fibrous filter set 42 to the output 46. In the meantime, granular filters 38 and fibrous filters 41 are regenerating. In FIG. 6, in the third step of the merrygoround cycle, the tank 40 receives input from the conduit 47, the effluent then passing to tank 38, and the effluent then passing to fibrous filter 41; tank 39 and fibrous filter 42 are regenerating during this part of the cycle. This arrangement has the advantage that a newly regenerated filter bed is the second in a series of two filter beds, the first in the set being a filter bed which has previously been used for purification, and accordingly, its take up capacity is utilised to the best advantage.

The water from which the protein and fat has been removed, may also be passed to waste, but usually this water will have been purified efficiently, to enable the water to be reused for certain rough cleansing purposes, for example, hide washing.

In FIG. 7 there is shown semi-diagrammatically a plant for operating the process of the invention. This consists of two tanks 100 each constructed from stainless steel and each being about four feet in diameter and about six feet in height. Their domed bottoms are connected to outlet pipes 101 leading a manifold 102 having three outlet valves 103, 104 and 105. A layer of gravel (¼ in. screened) 106 some 9 ins. in depth was placed in the bottom of each tank 100. A spiral distributor pipe 107 having a side outlet 108 was positioned on top of layer 106 and this in turn was covered with a 3 in. deep layer 109 of stone chippings (⅛" screened).

The tanks 100 were partly filled with water and sufficient resin was then added with stirring so that on settling the resin formed beds 110 some 12 ins. in depth.

Some four feet above the top of the bed of resin were positioned in each tank spray rings 111 through which liquid can be introduced into the tank.

Reference numeral 112 represents a source of effluent to be treated, 113 a source of deionized water and 144 a source of regenerant solution. By means of suitable pipework and suitable manipulation of valves 115 to 119 any of the three liquids, i.e. effluent, deionized water or regenerant, can be introduced at will into the tanks 110.

The beds of resin can be back-washed when desired by pumping water through pipes 108 and the spiral distributor pipes 107, the backwashings being removed from the tank through overflow pipes 120. Pipes 120 are connected to an overflow collar 121, the overflow of solids being prevented by a mesh screen 122.

The following Examples serve to illustrate the invention further.

EXAMPLE 1

Using the apparatus of FIG. 7, a bed 110 of 50 to 100 mesh (British Standard 410/62) epichlorhydrin cross-linked regenerated cellulose containing diethylaminoethyl groups in the free base form was formed in each of the tanks 100. This ion exchange resin was made in accordance with the directions of Example 2 of U.S. Pat. 3,573,277, but using viscose of 50 to 100 mesh size (British Standard 410/62).

Meat works effluent, which had been pretreated by submission to air flotation and settling to remove fat and insoluble protein, was passed into the tanks 100 through the spray rings 111 from the tank 112. This effluent resulted from slaughter of sheep and cattle and had a pH of 6.5. The effluent was passed from the tank 112 through spray rings 111 and the plant was run with the tanks 100 completely full of liquid. By adjustment of the outlet valves 103 to 105 the flow of effluent through the beds 110 was maintained at approximately 1 gallon per square foot per minute giving a total flow of approximately 24 gallons per minute for the two tanks together. In this way, during a working cycle of 7 hours, a total of about 10,000 gallons of effluent was treated.

The pretreated effluent was brown in colour with a C.O.D. (Chemical Oxygen Demand) value which varied between about 500 and 2000. The Chemical Oxygen Demand (C.O.D.), is the quantity of oxygen, expressed in p.p.m., consumed under specific conditions, in the oxidation of the organic and oxidizable inorganics contained in water and waste water, corrected for influence of chlorides. For a description of its estimation see Methods for Examination of Water and Waste Water, twelfth edition, Public Health Association, New York, N.Y. 1965 (pages 510–514).

The eluate from the ion exchange beds was water clear during most of the working cycle with a faint yellow colour appearing towards the end of the working cycle. Continuous measurement of the C.O.D. value of the eluate showed an average reduction of 90% compared with the pretreated effluent applied to the beds of resin. During most of the cycle, breakthrough of protein (as indicated by the phosphotungstic acid precipitation test) was absent, except towards the end of the cycle when trace amounts appeared in the effluent.

At the end of the 7 hour cycle the beds were regenerated by applying 1 bed volume of alkaline brine regenerant (1% NaOH + 3.5% NaCl) from the tank 114 to each ion exchange bed 110 after allowing the effluent level to drain down to the surface of the resin. The alkaline brine was run slowly into the beds 110 and allowed to remain for 1 hour, after which it was slowly displaced by adding water on top of the beds 110. Most of the protein taken up by the resin was displaced in little over 1 bed volume of liquid.

The regenerant solution coming from the beds was almost black in colour and the pH of the solution was about 11. The pH of the regenerant solution was then adjusted to about 5 by adding sulphuric acid, upon which a copious fine precipitate of protein formed.

Steam was then blown through the solution to raise the temperature to 80° C. to cause coagulation of the protein into lumps. The coagulated protein was then separated from the mother liquor on an 80 mesh (British Standard 410/62) wire basket strainer. The mother liquor was almost free of protein and was colourless. After draining for some hours the protein cake had a solids content of about 10% and was dried in a hot air tunnel.

After regeneration was completed the resin beds were washed with about three bed volumes of water and effluent was then applied for the next 7 hour working cycle.

10 to 20 lbs. of protein were recovered from each bed per cycle on the average and virtually no protein was lost in the final effluent or the mother liquor from the regenerant after coagulating the protein. The recovered protein was used as poultry food.

Occasionally (for example every 10 or 20 cycles) the beds were freed from insoluble matter by backwashing with water through the pipe 108 and spiral distribution pipe 107 the backwashings being swept out of the tank through pipe 120 and discarded.

The resin can be used many times and it has been found that the resin used in this Example shows no diminution in activity even after several hundred cycles.

The following Table shows the amino acid composition of two samples of protein recovered from the pilot plant of FIG. 7. For comparison the corresponding compositions of some related proteins are also listed.

TABLE 1

[Grams amino acid/16 grams nitrogen]

| Amino acid | Recovered solids Fraction A | Recovered solids Fraction B | Blood proteins (reference below) Fibrin | Hemoglobins | Serum proteins | Casein |
|---|---|---|---|---|---|---|
| Lysine | 8.8 | 8.5 | 9.1 | 9.1 | 10.0 | 8.5 |
| Histidine | 3.9 | 5.9 | 2.9 | 8.0 | 3.3 | 3.2 |
| Arginine | 4.4 | 4.7 | 7.8 | 3.9 | 5.8 | 4.2 |
| Aspartic acid | 14.3 | 9.4 | 11.9 | 9.8 | 10.3 | 7.0 |
| Threonine [1] | 7.9 | 4.5 | 7.3 | 5–6 | 12.6 | 4.5 |
| Serine [2] | 7.7 | 5.7 | 12.5 | 5.5 | 18.2 | 6.8 |
| Glutamic acid | 19.3 | 10.0 | 15.0 | 8.1 | 14.2 | 23.0 |
| Proline | 6.6 | 3.2 | 5.3 | 4.7 | 5.5 | 13.1 |
| Glycine | 5.5 | 3.5 | 5.4 | 5.3 | 2.0 | 2.1 |
| Alanine | 8.8 | 6.8 | 4.0 | 9.8 | | 3.3 |
| Half-cystine | Trace | Trace | 3.8 | 1.0–2.2 | 7.0 | 0.8 |
| Valine | 11.0 | 8.2 | 5.6 | 9.0 | 7.5 | 7.7 |
| Methionine | 2.8 | 3.2 | 2.6 | 1–3 | 4.0 | 3.5 |
| Isoleucine | 5.5 | 4.1 | 5.6 | 0–2 | 3.4 | 7.5 |
| Leucine | 17.1 | 15.0 | 7.1 | 14.4 | 10.1 | 10.0 |
| Tyrosine [1] | 5.5 | 3.2 | 6.0 | 2.9 | 5.5 | 6.4 |
| Phenylalanine | 9.9 | 7.9 | 4.5 | 7–8 | 5.2 | 6.3 |
| Ammonia | 1.4 | 1.1 | | | | |
| Total | 140 | 105 | | | | |

[1] Multiplied by 1.1 to allow (roughly) for decomposition in hydrolysis.
[2] Multiplied by 1.4, same reason.

NOTE.—Reference for comparative analyses: "The Amino Acid Composition of Proteins and Foods" R. J. Block and D. Bolling (1951, 2d Ed.) Published by: Charles C. Thomas, U.S.A.

Both samples A and B contain excellent protein from a nutritional point of view as shown by the amino acid composition. From a nitrogen analysis it was estimated that sample A contained about 61.3% protein whereas sample B contained about 73.9% protein.

EXAMPLE 2

This Example illustrates the use of a dichlorhydrin cross-linked regenerated cellulose resin containing carboxymethyl groups for purifying an effluent from a poultry processing factory. The resin can be prepared by the procedure of Example 3 of U.S. Pat. No. 3,573,277, except that the 5 ml. of epichlorhydrin is replaced by 5 ml. dichlorhydrin.

The resin was slurried and poured in a conventional manner into a chromatography column 5 cm. in diameter so as to form a column approximately 30 cm. long.

The effluent from the poultry processing factory was filtered by passage through an 80-mesh screen (British Standard 410/62) to remove suspended solids and then subjected to air flotation to remove at least part of the protein in the effluent. After scraping off the scum formed by the air flotation treatment the effluent was ready for passage through the bed (30 cm. x 5 cm.) of ion exchange resin.

5 gallons of the thus-treated effluent were passed through the bed of resin. Monitoring of the U.V. absorbance of the eluate at 280 m$\mu$ showed that the majority of the remaining protein was being asborbed by the resin. Regeneration was accomplished using approximately one bed volume (about 600 ml.) of regenerant (3% by weight NaCl, 1% by weight NaOH). The regenerant eluate was then acidified to pH 4 and sodium hexametaphosphate (5 g.) added. The precipitate of protein was centrifuged off and dried to give approximately 30 g. of protein. The regenerated bed was washed and the cycle repeated.

The factory had a throughput of about 20,000 birds daily which were killed, plucked and dressed. A proportion of the throughput was cooked in pressure cookers to provide chicken meat for chicken pies. The effluent contained not only the effluent from the killing, plucking and dressing section but also the cooking liquors.

EXAMPLE 3

The effluent from a natural rubber latex processing plant, which contains the liquor resulting after coagulation of the rubber from the latex, is a dark liquid which can be shown to contain protein.

The procedure of Example 2 was repeated except that the resin used was Resin C, i.e. epichlorhydrin cross-linked regenerated cellulose containing DEAE groups. The eluate was water clear and was shown by monitoring its U.V. absorbance at 280 m$\mu$ to be essentially protein free. The exhausted bed of resin could be regenerated as described in Example 2.

EXAMPLE 4

5 gallons of an effluent from a poultry processing factory having a C.O.D. value of 1000 was passed through a bed (30 cm. x 5 cm.) of epichlorhydrin cross-linked regenerated cellulose containing diethylaminoethyl groups (i.e. Resin C); this reduced its C.O.D. value to 149. Further passage of the effluent through a second bed (30 cm. x 5 cm.) of epichlorhydrin cross-linked regenerated cellulose containing carboxymethyl groups (i.e. Resin D) reduced its C.O.D. value to 94. The exhausted resin beds can be regenerated as described in Example 2 to recover the absorbed protein.

EXAMPLE 5

Example 4 is repeated except that Resin E is used in place of Resin C with equally good results.

EXAMPLE 6

The procedure of Example 4 is followed but the eluate from the bed of Resin C is then passed through a bed of fibrous DEAE-cellulose.

EXAMPLE 7

The procedure of Example 4 is repeated with the addition of the final step of passing the resulting eluate through a bone char filter.

What is claimed is:
1. A process for the purification of a waste effluent containing protein which comprises the steps of:
   (a) passing said effluent through a bed of a particulate cellulose-based ion exchange material so as to adsorb protein from said effluent, said ion exchange material comprising a matrix of cellulose chains in regenerated form which carry ion exchange groups and which are cross-linked by residues of at least one cross-linking agent which is itself free from ion exchange groups, the degree of cross-linking in said ion exchange material being from 1 to 10% by weight calculated as the weight of reacted cross-linking agent based on the weight of cellulose; and
   (b) subsequently regenerating said ion exchange material for use in a further cycle.
2. A process for the purification of an effluent containing protein which comprises the steps of:
   (a) submitting the effluent to a pretreatment so as to effect precipitation of coagulable proteins and at least a substantial part of any fat present;
   (b) separating the precipitated solids from the effluent;
   (c) passing the effluent through one or more beds of a granular ion exchange material so as to adsorb protein from the effluent, which ion exchange material comprises a matrix of cellulose chains in regenerated form which carry ion exchange groups linked thereto and which are cross-linked by the residues of a cross-linking agent which is itself free from ion exchange groups, the degree of cross-linking being from 1 to 10% by weight calculated as the amount of cross-linking agent that has reacted with a given weight of cellulose;
   (d) recovering from the bed or beds of the ion exchange material an essentially protein-free liquid; and
   (e) regenerating the bed or beds of the ion exchange material.

References Cited

UNITED STATES PATENTS

| | | | |
|---|---|---|---|
| 2,446,913 | 8/1948 | Erlich | 260—112 R |
| 3,697,419 | 7/1969 | Grant | 210—27 |
| 3,314,880 | 4/1967 | Rubin | 210—44 |
| 3,409,605 | 11/1968 | Florini | 260—112 R |
| 2,992,215 | 7/1961 | Bullock et al. | 210—37 X |
| 3,122,456 | 2/1964 | Meier et al. | 210—37 X |
| 3,446,794 | 5/1969 | Knight et al. | 210—24 X |
| 3,234,199 | 2/1966 | Reid | 260—112 R |
| 3,487,064 | 12/1969 | Swanson et al. | 260—112 R |
| 3,573,277 | 3/1971 | Grant | 260—231 |

OTHER REFERENCES

Peterson and Sober, JACS, Feb. 20, 1956, pp. 751–755.

JOHN ADEE, Primary Examiner

IVARS CINTINS, Assistant Examiner

U.S. Cl. X.R.

210—30; 260—112.R